United States Patent
Wang

(10) Patent No.: US 8,491,127 B2
(45) Date of Patent: Jul. 23, 2013

(54) AUTO-FOCUSING PROJECTOR AND METHOD FOR AUTOMATICALLY FOCUSING THE PROJECTOR

(75) Inventor: Guang-Jian Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 315 days.

(21) Appl. No.: 13/004,035

(22) Filed: Jan. 11, 2011

(65) Prior Publication Data

US 2012/0050701 A1    Mar. 1, 2012

(30) Foreign Application Priority Data

Aug. 27, 2010   (CN) .......................... 2010 1 0265259

(51) Int. Cl.
*G03B 21/14* (2006.01)
*G03B 3/00* (2006.01)
*G03B 21/00* (2006.01)
*G02B 15/14* (2006.01)

(52) U.S. Cl.
USPC .............. 353/69; 353/101; 353/121; 359/698

(58) Field of Classification Search
USPC ....... 353/69, 101, 121, 76; 352/140; 348/745; 359/649, 650, 651, 698
See application file for complete search history.

(56) References Cited

U.S. PATENT DOCUMENTS

| 2006/0114431 A1* | 6/2006 | Ushiro ........................ 353/119 |
| 2007/0008505 A1* | 1/2007 | Eguchi ........................ 353/101 |
| 2010/0214540 A1* | 8/2010 | Sajadi et al. ................. 353/101 |

* cited by examiner

*Primary Examiner* — William C Dowling
*Assistant Examiner* — Ryan Howard
(74) *Attorney, Agent, or Firm* — Altis Law Group, Inc.

(57) ABSTRACT

A method for automatically focusing a projector includes a projection lens, a driver device and an image capturing device. The method sets an interval step according to a focusing range of the projection lens, reads a predefined picture from a storage system of the projector, and controls the projection lens to project the picture to a projection area. The method controls the image capturing device to capture an image of the picture from the projection area when the projection lens moves at every interval step, and analyzes a contrast of each of the images to determine an optimal image from the images. The method determines a current focus of the projection lens having the optimal image as an optimal focus of the projection lens, and drives the driver device to control the projection lens to move at the optimal focus.

15 Claims, 2 Drawing Sheets

US 8,491,127 B2

AUTO-FOCUSING PROJECTOR AND METHOD FOR AUTOMATICALLY FOCUSING THE PROJECTOR

BACKGROUND

1. Technical Field

Embodiments of the present disclosure relate to optical devices and methods for adjusting focus of the optical devices, and particularly to an auto-focusing projector and a method for automatically focusing of the projector.

2. Description of Related Art

It is known in the art, that a projector needs to employ a projector system which automatically focuses the projector. While currently projectors are designed with automatic focusing systems, a user must try to set up the projector within an allowable distance range of the focusing system included in the projector. Also, the user must employ his/her own visual feedback on different images projected on a projection surface in order to achieve an optimal projection image. As can be seen, these automatic focusing systems have been met with a modicum of success, but still they do not provide feedback to the user to allow the user to properly focus the projector.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
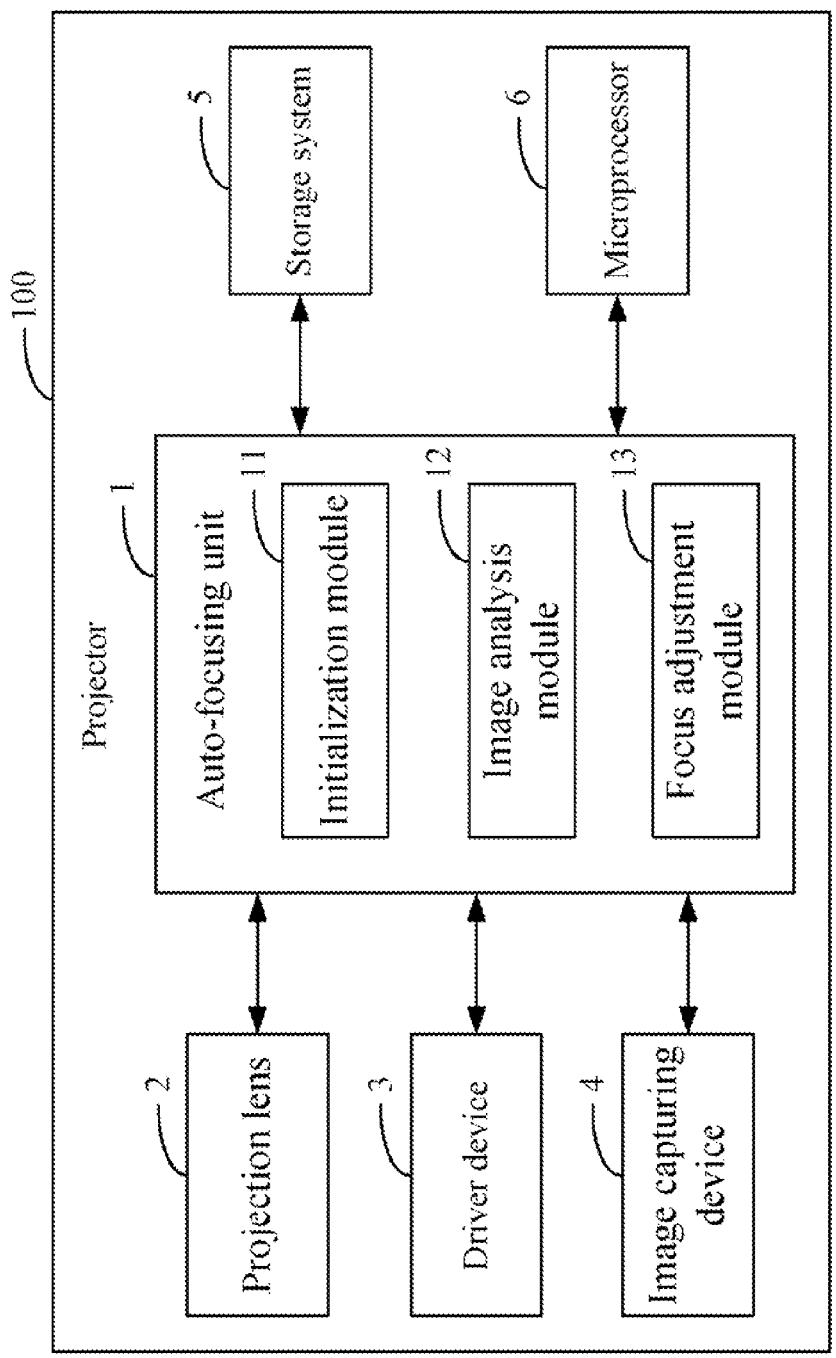
FIG. 1 is a block diagram of one embodiment of an auto-focusing projector.

FIG. 1 is a block diagram of one embodiment of an auto-focusing projector 100. In the embodiment, the projector 100 includes an auto-focusing unit 1, a projection lens 2, a driver device 3, an image capturing device 4, a storage system 5, and a least one microprocessor 6. It should be understood that FIG. 1 illustrates only one example of the projector 100, and may include more or fewer components than illustrated, or a different configuration of the various components in other embodiments.

In one embodiment, the auto-focusing unit 1 may comprise computerized code in the form of one or more programs that are stored in the storage system 5 and executed by the at least one microprocessor 6. The auto-focusing unit 1 can automatically adjust the focus of the projection lens 2 to focus the projector 100, to obtain optimal projected images when the projector 100 projects pictures (e.g., a back and white picture, or a color picture) on a projection area, such as a wall surface or a display screen, for example.

The projection lens 2 is an optical lens which has changeable focus within a focusing range, and is operable to project the pictures on the projection area according to the focusing range. In one embodiment, the focusing range may be defined as focus values from about 0 mm to about 18 mm, where the focus value "0 mm" is defined as an initial position of the focusing range, and the focus value "18 mm" is defined as a top position of the focusing range.

The driver device 3 is operable to control the projection lens 2 to move from the initial position to the top position within the focusing range, to change the focus of the projection lens 2 during the process of projecting the pictures on the projection area. In one embodiment, the driver device 3 may be a driving motor that can drive the projection lens automatically.

The image capturing device 4 is operable to capture images of the pictures from the projection area, and send each of the images to the auto-focusing unit 1 for analyzing the image to adjust the focus of the projection lens 2. In one embodiment, the image capturing device 4 may be a camera device that can capture the images of the pictures from the projection area.

The storage system 5 stores a predefined picture that has a special shape, such as a circle picture or a square picture, for example. In one embodiment, the storage system 5 may be an internal storage device, such as a random access memory (RAM) for temporary storage of information, and/or a read only memory (ROM) for permanent storage of information. In some embodiments, the storage system 5 may also be an external storage device, such as an external hard disk, a storage card, or a data storage medium.

In one embodiment, the auto-focusing unit 1 includes an initialization module 11, an image analysis module 12, and a focus adjustment module 13. The modules 11-13 may comprise computerized code in the form of one or more programs that are stored in the storage system 5. The computerized code includes instructions that are executed by the at least one microprocessor 6 to provide functions for implementing the modules 11-13. In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

The initialization module 11 is operable to set an interval step for adjusting the focus of the projection lens 2 according to the focusing range of the projection lens 2. In one embodiment, the interval step may be set as 2 mm, for example. The initialization module 11 is further operable to read the predefined picture from the storage system 5, and control the projection lens 2 to project the predefined picture on the projection area. In addition, the initialization module 11 drives the driver device 3 to control the projection lens 2 to move at the initial position (i.e., 0 mm) of the focusing range when the auto-focusing projector 100 is powered on.

The image analysis module 12 is operable to control the image capturing device 4 to capture an image of the predefined picture from the projection area when the projection lens 2 moves at every interval step, and calculate a contrast of each of the images by analyzing an RGB (red, green, and black) value of all pixels of the image. In one embodiment, the image analysis module 12 analyzes the contrast of each of the images to find an optimal image from all the captured images, and determines a current position of the projection lens 2 having the optimal image as an optimal focus of the projection lens 2. When the projection lens 2 focus at optimal focus, the projection lens 2 can project the optimal image to the projection area, where the optimal image has the maximum contrast.

In one embodiment, the image analysis module 12 controls the image capturing device 4 to capture a first image of the predefined picture from the projection area when the projection lens 2 moves at the initial position of the focusing range, and calculates a first contrast of the first image by analyzing an RGB value of all pixels of the first image. The image analysis module 12 controls the image capturing device 4 to capture a second image of the predefined picture from the projection area when the projection lens 2 moves by one interval step, and calculates a second contrast of the second image by analyzing a RGB value of all pixels of the second image. The image analysis module 12 further compares the first contrast of the first image with the second contrast of the second image, and saves the second image as the first image when the second contrast of the second image is greater than the first contrast of the first image. After the projection lens 2 moves to the next interval step, the image analysis module 12 then captures the next image of the predefined picture from the projection area as the second image.

The focus adjustment module 13 is operable to drive the driver device 3 to control the projection lens 2 to move at every interval step within the focusing range, and control the projection lens 2 to focus at the optimal focus of the projection lens 2. In one embodiment, the focus adjustment module 13 drives the driver device 3 to control the projection lens 2 to move back by one interval step when the second contrast of the second image is not greater than the first contrast of the first image, and determines the current position of the projection lens 2 as the optimal focus of the projection lens 2.

Figure 2:
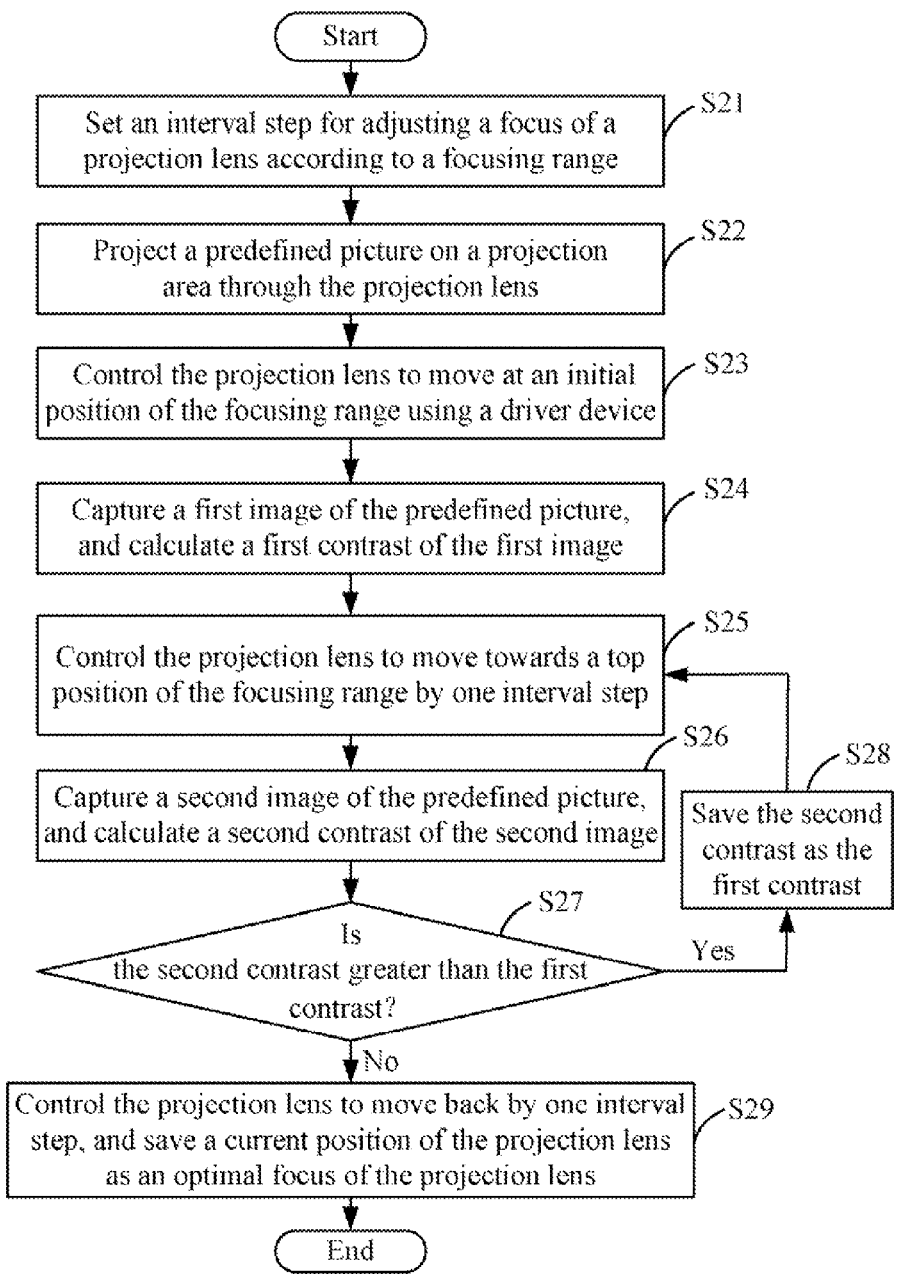
FIG. 2 is a flowchart of one embodiment of a method for automatically focusing the projector of FIG. 1.

FIG. 2 is a flowchart of one embodiment of a method for automatically focusing the projector 100 of FIG. 1. The method can automatically adjust focus of the projection lens 2 to focus the projector 100, so as to obtain an optimal projection image when the projector 100 projects a picture (e.g., a back and white picture, or a color picture) in the projection area. Depending on the embodiment, additional blocks may be added, others removed, and the ordering of the blocks may be changed.

In block S21, the initialization module 11 sets an interval step for adjusting the focus of the projection lens 2 according to a focusing range of the projection lens 2. In one embodiment, the focusing range may be defined as focus values from about 0 mm to about 18 mm, where the focus value "0 mm" is defined as an initial position of the focusing range, and the focus value "18 mm" is defined as a top position of the focusing range. The interval step may be set as 2 mm, for example.

In block S22, the initialization module 11 reads a predefined picture from the storage system 5, and controls the projection lens 2 to project the predefined picture on the projection area. As mentioned above, the predefined picture may have a special shape, such as a circle picture, or a square picture.

In block S23, the initialization module 11 drives the driver device 3 to control the projection lens 2 to move to the initial position (i.e., 0 mm) of the focusing range when the projector 100 is powered on.

In block S24, the image analysis module 12 controls the image capturing device 4 to capture a first image of the predefined picture from the projection area when the projection lens 2 moves at the initial position of the focusing range, and calculates a first contrast of the first image by analyzing an RGB value of all pixels of the first image.

In block S25, the focus adjustment module 13 drives the driver device 3 to control the projection lens 2 to move towards the top position of the focusing range by one interval step.

In block S26, the image analysis module 12 controls the image capturing device 4 to capture a second image of the predefined picture from the projection area after the projection lens 2 has been moved one interval step, and calculates a second contrast of the second image by analyzing an RGB value of all pixels of the second image.

In block S27, the image analysis module 12 compares the first contrast of the first image with the second contrast of the second image to determine whether the second contrast is greater than the first contrast. If the second contrast is greater than the first contrast, block S28 is implemented. Otherwise, if the second contrast is not greater than the first contrast, block S29 is implemented.

In block S28, the image analysis module 12 saves the second image as the first image in the storage system 5, and saves the second contrast as the first contrast. In one embodiment, the image analysis module 12 controls the image capturing device 4 to capture a next image of the predefined picture from the projection area as the second image when the projection lens 2 moves at the next interval step.

In block S29, the focus adjustment module 13 drives the driver device 3 to control the projection lens 2 to move back by one interval step when the second contrast is not greater than the first contrast, determines a current position of the projection lens 2 having the optimal image as an optimal focus of the projection lens 2. As such, the driver device 3 controls the projection lens 2 to focus at the optimal focus of the projection lens 2 that corresponds to the captured image having the maximum contrast.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An auto-focusing projector, comprising:
a projection lens, a driver device, a storage system, and an image capturing device; and
one or more programs stored in the storage system and executable by at least one microprocessor, the one or more programs comprising:
an initialization module operable to set an interval step for adjusting a focus of the projection lens according to a focusing range of the projection lens, read a predefined picture from the storage system, and control the projection lens to project the predefined picture on a projection area;
an image analysis module operable to capture an image of the predefined picture from the projection area using the image capturing device when the projection lens moves at every interval step, calculate a contrast of each of the images, analyze the contrast of each of the images to determine an optimal image from all the images, and determine a current position of the projection lens having the optimal image as an optimal focus of the projection lens; and
an focus adjustment module operable to drive the driver device to control the projection lens to move within the focusing range at every interval step, and control the projection lens to focus at the optimal focus of the projection lens;
wherein the optimal image is determined by steps of:
(a) controlling the image capturing device to capture a first image of the predefined picture from the projection area when the projection lens locates at an initial position of the focusing range, and calculating a first contrast of the first image;
(b) controlling the image capturing device to capture a second image of the predefined picture from the projection area when the projection lens moves by one interval step, and calculating a second contrast of the second image;

(c) determining whether the second contrast of the second image is greater than the first contrast of the first image;

(d) saving the second image as the first image and regarding the second contrast as the first contrast, upon the condition that the second contrast of the second image is greater than the first contrast of the first image;

(e) repeating step (b) to step (d) until the second contrast of the second image is not greater than the first contrast of the first image; and (f) determining an image having the maximum contrast as the optimal image.

2. The projector according to claim 1, wherein the initialization module is further operable to drive the driver device to control the projection lens to move to the initial position of the focusing range when the projector is powered on.

3. The projector according to claim 1, wherein the image analysis module calculates the contrast of each of the images by analyzing an RGB value of all pixels of the image.

4. The projector according to claim 1, wherein the projection lens is an optical lens whose focus is changeable within the focusing range.

5. The projector according to claim 1, wherein the driver device is a driving motor that drives the projection lens to move within the focusing range automatically.

6. A method for automatically focusing a projector, the projector comprising a projection lens, a driver device, an image capturing device, and a storage system, the method comprising:

setting an interval step for adjusting a focus of the projection lens according to a focusing range of the projection lens;

reading a predefined picture from the storage system, and controlling the projection lens to project the predefined picture on a projection area;

controlling the image capturing device to capture an image of the predefined picture from the projection area when the projection lens moves at every interval step;

calculating a contrast of each of the images, and analyzing the contrast of each of the images to determine an optimal image from all the images;

determining a current position of the projection lens having the optimal image as an optimal focus of the projection lens, wherein the optimal image is determined by steps of:

(a) controlling the image capturing device to capture a first image of the predefined picture from the projection area when the projection lens locates at an initial position of the focusing range, and calculating a first contrast of the first image;

(b) controlling the image capturing device to capture a second image of the predefined picture from the projection area when the projection lens moves by one interval step, and calculating a second contrast of the second image;

(c) determining whether the second contrast of the second image is greater than the first contrast of the first image;

(d) saving the second image as the first image and regarding the second contrast as the first contrast, upon the condition that the second contrast of the second image is greater than the first contrast of the first image;

(e) repeating step (b) to step (d) until the second contrast of the second image is not greater than the first contrast of the first image; and (f) determining an image having the maximum contrast as the optimal image; and controlling the projection lens to focus at the optimal focus of the projection lens using the driver device.

7. The method according to claim 6, further comprising a step of:

controlling the projection lens to move to the initial position of the focusing range when the projector is powered on.

8. The method according to claim 6, wherein the contrast of each of the images is calculated by analyzing an RGB value of all pixels of the image.

9. The method according to claim 6, wherein the projection lens is an optical lens whose focus is changeable within the focusing range.

10. The method according to claim 6, wherein the driver device is a driving motor that drives the projection lens to move within the focusing range automatically.

11. A non-transitory storage medium having stored thereon instructions that, when executed by at least one microprocessor of a projector, causes the microprocessor to perform method for automatically focusing the projector, the projector comprising a projection lens, a driver device, an image capturing device, and a storage system, the method comprising:

setting an interval step for adjusting a focus of the projection lens according to a focusing range of the projection lens;

reading a predefined picture from the storage system, and controlling the projection lens to project the predefined picture on a projection area;

controlling the image capturing device to capture an image of the predefined picture from the projection area when the projection lens moves at every interval step;

calculating a contrast of each of the images, and analyzing the contrast of each of the images to determine an optimal image from all the images;

determining a current position of the projection lens having the optimal image as an optimal focus of the projection lens, wherein the optimal image is determined by steps of:

(a) controlling the image capturing device to capture a first image of the predefined picture from the projection area when the projection lens locates at an initial position of the focusing range, and calculating a first contrast of the first image;

(b) controlling the image capturing device to capture a second image of the predefined picture from the projection area when the projection lens moves by one interval step, and calculating a second contrast of the second image;

(c) determining whether the second contrast of the second image is greater than the first contrast of the first image;

(d) saving the second image as the first image and regarding the second contrast as the first contrast, upon the condition that the second contrast of the second image is greater than the first contrast of the first image;

(e) repeating step (b) to step (d) until the second contrast of the second image is not greater than the first contrast of the first image; and (f) determining an image having the maximum contrast as the optimal image; and controlling the projection lens to focus at the optimal focus of the projection lens using the driver device.

12. The storage medium according to claim 11, wherein the method further comprises:

controlling the projection lens to move to the initial position of the focusing range when the projector is powered on.

13. The storage medium according to claim 11, wherein the contrast of each of the images is calculated by analyzing an RGB value of all pixels of the image.

14. The storage medium according to claim 11, wherein the projection lens is an optical lens whose focus is changeable within the focusing range.

15. The storage medium according to claim 11, wherein the driver device is a driving motor that drives the projection lens to move within the focusing range automatically.

* * * * *